Nov. 17, 1931. G. THORNE 1,832,514
ORNAMENTED RUBBER ARTICLE AND METHOD OF MAKING THE SAME
Filed June 5, 1930
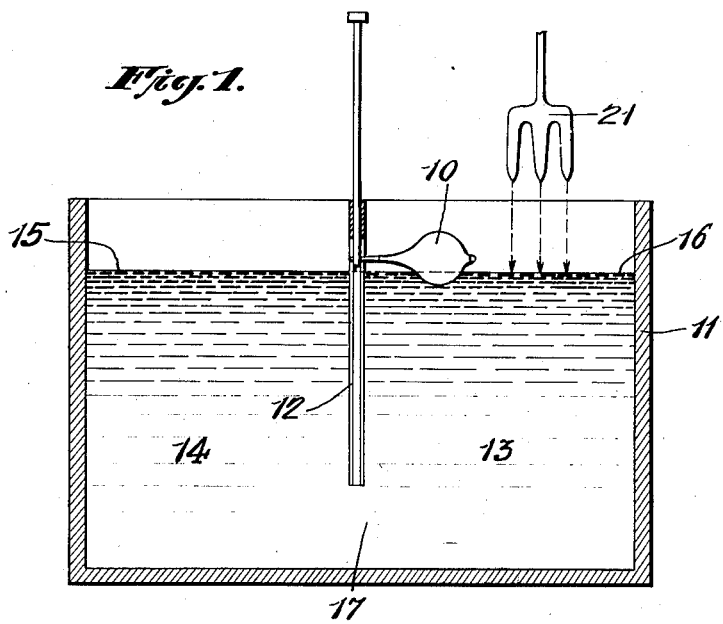
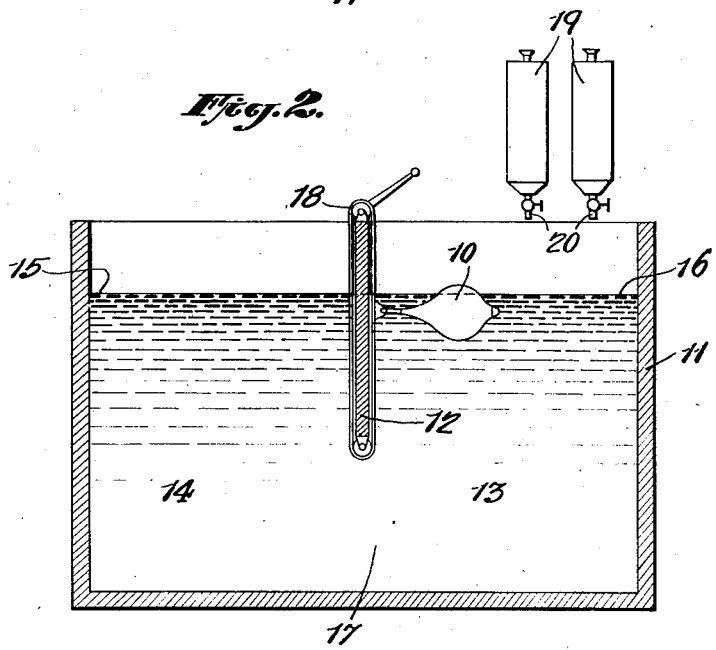
Inventor
GEORGE THORNE.
By
His Attorneys Patented Nov. 17, 1931

1,832,514

UNITED STATES PATENT OFFICE

GEORGE THORNE, OF LIVERPOOL, ENGLAND, ASSIGNOR TO DUNLOP RUBBER COMPANY LIMITED, A CORPORATION OF GREAT BRITAIN

ORNAMENTED RUBBER ARTICLE AND METHOD OF MAKING THE SAME

Application filed June 5, 1930, Serial No. 459,407, and in Great Britain June 28, 1929.

This invention relates to rubber articles having a surface ornamentation of jazz-type patterns, that is one having a color pattern of no fixed design, and to a method and apparatus for forming such articles.

More particularly the invention relates to a rubber article formed by the deposit of dispersed material from an aqueous dispersion or organic materials and to a method of forming and ornamenting such articles. Advantages of the invention are to provide a rubber article having a surface ornamentation and an irregular variegated or modernistic pattern and to a method and apparatus in which such articles may be formed and in which the ornamentations may be applied in a simple and easy manner.

According to my invention a shape or former or other suitable surface is covered with a layer of a suitable aqueous dispersion of rubber or equivalent materials which are then coagulated and after coagulation are introduced or dipped into a surface of a body of water or other medium having on its surface streams of colored solution arranged in a variegated, modernistic or irregular pattern, that is interspersed with no fixed pattern, and thereafter withdrawing the shape or former together with its layer of coagulated dispersion and the deposit of irregular arranged color areas formed thereon through the clear water and other aqueous medium substantially free from floating color solutions. The aqueous dispersions from which the body of the article is to be ornamented or formed may, for example, be of natural or artificial dispersions of rubber or other natural resins or may be an artificial or natural dispersion of balata or mixtures of various vegetable resins or a dispersion of artificial rubber. The dispersion may be in a concentrated form and compounded or not compounded with various compounding ingredients and may be in a non-vulcanized or vulcanized condition. It may be of a type to yield when dry and vulcanized either soft or hard rubber articles. The shape or former or surface on which the article is to be formed may be covered with the aqueous dispersion by any one or more of the known processes of dipping, spreading, spraying or electrophoresis.

The colors of which the irregular pattern are to be formed may be made of any suitable rubber composition as, for example, from rubber, inorganic pigments and petroleum spirit. Said inorganic pigments may, for example, be cadmium sulphide or vermilion.

These colors are floated in irregular streams on the surface of a body of water to form the patterns. The former or surface containing the coagulated deposit of rubber dispersion is then passed into contact with the floated colors so that the latter adheres to the coagulated deposit in approximately the pattern formed by the floating of the colors. The thus coated deposit is then removed through and from the body of water without again coming into contact with the surface containing the color layer. Preferably the deposit of coagulated rubber and the coating formed thereon are carried through the body of water on which the color pattern is floated and removed from a clear area or surface of the water.

The formation of the color patterns and the treatment of the coagulated latex deposit may be accomplished in any suitable apparatus. It is preferably accomplished, however, by the apparatus shown in the accompanying drawings in which Fig. 1 is a vertical section of a dipping tank of a color or pattern forming device for carrying on the invention and Fig. 2 is a modified form of an embodiment of the invention.

A former or mold 10 having a deposit of coagulated latex or other dispersed material is introduced into a tank 11 at one side of a dividing partition 12 which extends nearly to the bottom of the tank 11 and divides the latter into two compartments, 13 and 14. The tank 11 is filled with a body of water to the level indicated at 15, there being thus formed two surface areas of water, one in compartment 13 and one in compartment 14. Over one of these surfaces, for example, that of compartment 13, there is floated a color layer 16 having one or more colors formed into an irregular variegated or modernistic pattern. The former 10 with its deposit of coagulated rubber dispersion is passed downwardly into contact with the color layer 16 whereupon the latter adheres to the surface of the deposit and is then carried downwardly through water in the compartment 13, then through the passage 17 between the lower end of the partition 12 and the bottom of the tank 11 and then into compartment 14. The article is then drawn upwardly out of the tank through the clear surface 15. The partition 12 may be provided with a suitable slot to enable the article 10 to be manipulated in the above manner or the article may be carried downwardly from one compartment to the other by means of an endless chain conveyor 18. The colors may be floated and formed into a pattern on the surface of water in compartment 13 in any suitable manner.

For example, the colors may be contained in containers 19 as indicated in Fig. 2, one container for each color and having outlets 20 through which the color streams may run onto the surface 16. The containers 19 may be swung lengthwise and transversely of the tank 11 or in various irregular paths so that the colors that drip from the outlets 20 are distributed in irregular patterns over the surface 16 of the water. Another way of applying the colors is to let them drip from the tines of the fork 21, Fig. 1, which is dipped into a color and the color then permitted to drip from the tines while the fork is held over the surface of the water and moved in an irregular path. It will be understood that one or more colors may be used in making the patterns.

Through the above invention a highly decorative and novel effect may be produced on articles such as rubber shoes formed by deposition from a rubber dispersion of uniform color.

What I claim is:

1. The method of producing color jazz-type patterns on articles subsequent to their formation from aqueous dispersions which comprises forming a deposit on a surface from an aqueous dispersion, coagulating said aqueous dispersion thereon and then introducing the deposit into water containing on its surface bodies of color in irregular arrangement.

2. The method of claim 1 in which the deposit is withdrawn through clear water substantially free from color after receiving its deposit of color.

3. The method of claim 1 in which the color patterns are formed on the surface of a body of water and in which the coagulated deposit is withdrawn from the body of water after receiving its deposit of color through the surface of water not covered by said colors.

4. The method of claim 1 in which the color layer comprises rubber, inorganic pigments and solvent.

5. The method of claim 1 in which the color layer consists of rubber, inorganic pigments and petroleum spirit.

6. The method of claim 1 in which the color patterns are formed on the surface of the water by dripping from moving sources.

7. An apparatus for forming colors in jazz-type patterns on rubber articles which comprises a water container, a partition extending downwardly in said container and forming a passage in the lower part of said container and means for dripping the color medium onto the surface of water in said container at one side of said partition.

8. The apparatus of claim 7 having color containers movable over the surface of the water at one side of said partition and having dripping taps.

9. The apparatus of claim 7 having a movable tank suspended above said water container at one side of said partition.

10. The apparatus of claim 7 having means for conveying an article downwardly through the surface of liquid in one compartment, then into the other compartment and upwardly therethrough.

In witness whereof, I have hereunto signed my name.

GEORGE THORNE.